United States Patent
Hung

[11] Patent Number: 5,948,475
[45] Date of Patent: Sep. 7, 1999

[54] ELEMENTAL METALS OR OXIDES DISTRIBUTED ON A CARBON SUBSTRATE OR SELF-SUPPORTED AND THE MANUFACTURING PROCESS USING GRAPHITE OXIDE AS TEMPLATE

[75] Inventor: Ching-Chen Hung, Westlake, Ohio

[73] Assignee: The United States of America as represented by the Administrator of the National Aeronautics and Space Administration, Washington, D.C.

[21] Appl. No.: 09/186,831

[22] Filed: Nov. 5, 1998

Related U.S. Application Data

[62] Division of application No. 08/833,107, Apr. 4, 1997.
[51] Int. Cl.$^6$ .............................. B05D 3/00; C01B 31/00
[52] U.S. Cl. ..................... 427/294; 423/414; 423/415.1; 423/448
[58] Field of Search ............................. 423/414, 415.1, 423/448, 294

[56] References Cited

U.S. PATENT DOCUMENTS

| | | |
|---|---|---|
| 3,615,829 | 10/1971 | Sprague . |
| 4,206,263 | 6/1980 | Regler et al. . |
| 4,584,252 | 4/1986 | Touzain et al. . |
| 4,666,628 | 5/1987 | Uchikawa . |
| 4,885,120 | 12/1989 | McQullian et al. . |
| 5,622,683 | 4/1997 | Hung ........................... 423/414 |
| 5,851,417 | 12/1998 | Hung ........................... 252/62.55 |

OTHER PUBLICATIONS

From Graphite to Porous Carbon Containing Nanoparticles through Chemical Reactions C.C. Hung: J. Corbin, Aprl. 8–12, 1996.
Fabrication of Iron–Containing Carbon Materials from Graphite Flouride, Chin–Cheh Hung, Jul. 16–21, 1995.

*Primary Examiner*—Michael Lusignan
*Attorney, Agent, or Firm*—Kent N. Stone

[57] ABSTRACT

A process for providing elemental metals or metal oxides distributed on a carbon substrate or self-supported utilizing graphite oxide as a percursor. The graphite oxide is exposed to one or more metal chlorides to form an intermediary product comprising carbon, metal, chloride, and oxygen. This intermediary product can be further processed by direct exposure to carbonate solutions to form a second intermediary product comprising carbon, metal carbonate, and oxygen. Either intermediary product may be further processed: a) in air to produce metal oxide; b) in an inert environment to produce metal oxide on carbon substrate; c) in a reducing environment to produce elemental metal distributed on carbon substrate. The product generally takes the shape of the carbon precursor.

1 Claim, 1 Drawing Sheet

ELEMENTAL METALS OR OXIDES DISTRIBUTED ON A CARBON SUBSTRATE OR SELF-SUPPORTED AND THE MANUFACTURING PROCESS USING GRAPHITE OXIDE AS TEMPLATE

This application is a division of application Ser. No. 08/833,107, filed Apr. 4, 1997.

BACKGROUND OF THE INVENTION

1. Field of Invention

This invention pertains generally to the art of producing metal or metal oxides distributed in a porous carbon substrate or elf-supported and more specifically to producing such compounds wherein graphite oxide is used as one of the original materials.

2. Description of the Related Art

In the art it is known to provide graphite oxide having foreign organic chemicals inserted therein. For the most part, the organic chemicals are only absorbed by the graphite oxide and do not break the chemical bonds in the graphite oxide. However, exposure of the graphite oxide to $H_2S$ or $CH_3OH$, for example, may result in chemical reactions between the graphite oxide and the organic chemicals to produce organic derivatives of graphite oxide.

Graphite oxide may also be partially reduced by a number of common reducing agents to produce graphite, although complete reduction has not been observed.

Metal oxides, porous or fibrous, may be produced in a sol-gel process which uses metal alkoxide, an organo-metallic compound, to produce a porous metal oxide (or ceramic) compound. After hydrolysis and polymerization, the material is treated by other physical processes (e.g., coating spinning, gelling, precipitation) and then heated to obtain the desired product.

Impregnation of chemical solutions in porous or activated carbon may produce carbon containing metal compounds. Such products are generally carbon with less than 10% by weight of the metal components.

Heating graphite oxide in an inert environment causes thermal decomposition at 150° C.–200° C. If the heating rate is high, the product is a very fine, about 20 Å, carbon powder. If the heating rate is low, then the graphite oxide does not disintegrate, but $H_2O$, $CO$, and $CO_2$ are released, and the product is a graphite-like carbon material which contains a substantial quantity of oxygen. This indicates incomplete thermal decomposition during slow heating to 200° C.

Attempts have also been made to provide reaction products similar to those obtain by the inventive processes using graphite fluoride as an initial reactant.

With reference to the above discussion of the related, it should be noted that graphite fluoride reacts with other chemicals generally around 200° C. to 450° C., although reaction with $AlCl_3$ may occur at temperatures around 150° C. Fluorine compounds are released during the reactions, which are highly corrosive at such temperatures.

Further, Hennig (1959) summarized the known organic derivatives of graphite oxide. Considering graphite oxide as an organic compound containing the functional groups —OH and =O, Hennig suggested that graphite oxide could react with organic compounds which are generally reactive to these functional groups. His summary indicates that except for the partial reduction of graphite oxide to graphite by reducing agents, these functional groups are surprisingly inactive.

The sol-gel process is expensive because of its complexity and high price of the reactant.

Lastly, the products from carbon impregnation have low concentration of non-carbon The present invention overcomes the foregoing difficulties encountered in the art in a way which is simple and efficient, while providing better and more advantageous results.

SUMMARY OF THE INVENTION

In accordance with the present invention, a new and improved process for producing a carbonaceous material comprising metal compounds from graphite oxide is provided.

More particularly in accordance with the invention, the process comprises the step of exposing the graphite oxide to a metal chloride at or below the thermal decomposition temperature of the graphite oxide for a time sufficient to obtain an intermediary carbonaceous reaction product comprising metal, oxygen, and chlorine.

According to one aspect of the invention, the "graphite oxide" includes those made from amorphous carbon (such as pitched based carbon fibers or activated carbon) through typical processes of making graphite oxide. The graphite oxide-like material made in this lab from amorphous carbon are structurally less orderly and contains less oxygen than the traditional graphite oxide, which is made from crystalline graphite. However, they are perfect reactants for the reactions described in this invention.

According to another aspect of the invention, the process further comprises the step of placing the intermediary carbonaceous product in aqueous solution containing potassium carbonate ($K_2CO_3$) or sodium carbonate ($Na_2CO_3$) to remove chlorine and obtain another intermediary carbonaceous product containing metal, oxygen, and carbonate. This step is optional, but is essential in the cases where the above-described metal chlorides are hygroscopic in ambient air or inert to oxygen or carbon at its melting point.

According to another aspect of the invention, the process further comprises the step of heating the intermediary carbonaceous reaction products in a reducing environment to remove the chlorine or carbonate and oxygen to produce a reaction product of carbon and metal.

According to another aspect of the invention, the process further comprises the step of heating the carbonaceous reaction product in an inert environment to remove the chlorine to produce a carbonaceous reaction product containing metal oxide particles.

According to another aspect of the invention, a process for producing a metal oxide from graphite oxide comprises the steps of exposing the graphite oxide to a metal chloride at a temperature below 200° C. for a time sufficient to form an intermediary carbonaceous material comprising the elements of metal, chlorine, and oxygen; (optionally) placing this intermediary product in aqueous solution containing potassium carbonate ($K_2CO_3$) or sodium carbonate ($Na_2CO_3$) to remove chlorine and obtain another intermediary carbonaceous product containing metal, oxygen, and carbonate; and, heating the intermediary carbonaceous material in air at a temperature of at least 300° C. for a time sufficient to oxidize and remove carbon and chlorine or carbonate to produce the metal oxide.

One advantage of the present invention is the use of graphite oxide as a precursor for further processing rather than graphite fluoride. Graphite oxide is safer, easier to produce, and less expensive than graphite fluoride.

Another advantage of the present invention is the mild conditions for the reaction between the graphite oxide and the metal chloride. In many cases, the reaction can occur in water solution.

Another advantage of the present invention is that the reaction products contain a large quantity of small particles. Therefore when the final product is ceramics, the yield is high, and the surface are is large.

Another advantage of the present invention is that the process does not require expensive organo-metallic compounds as reactants to produce gamma—$Al_2O_3$ having a surface area of $80m^2/g$.

Yet another advantage of the present invention is that the ceramic or carbon containing ceramic products take the form of the carbon precursor. Therefore, the final product may be in the form of a powder, fiber, or fabric.

Still other benefits and advantages of the invention will become apparent to those skilled in the art upon a reading and understanding of the following specification.

BRIEF DESCRIPTION OF THE DRAWINGS

The invention may take physical form in certain parts and arrangement of parts. A preferred embodiment of these parts will be discussed in detail in the specification and illustrated in the accompanying drawings, which form a part of this disclosure and wherein.

DESCRIPTION OF THE PREFERRED EMBODIMENT

Figure 1:
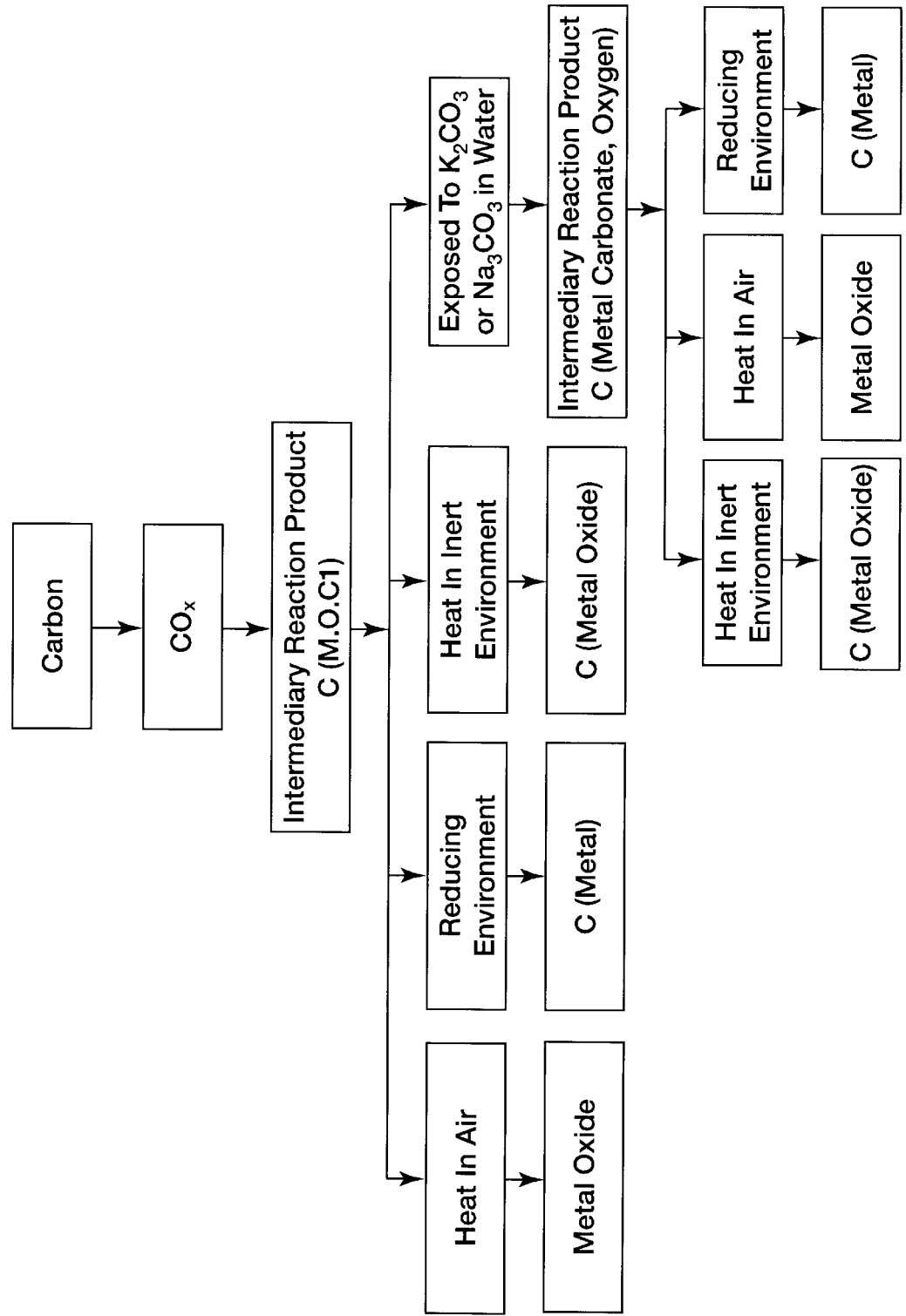
FIG. 1 is a schematic representation of the general processes according to the invention.

It will be understood that the specific embodiments described herein are merely illustrative of the general principles of the invention and that various modifications are feasible without departing from the spirit and scope of the invention.

With reference to FIG. 1, in the inventive process described herein, graphite oxide is formed by processes known in the art. The preferred embodiment of the invention uses the method developed by Hummers and Offeman (1958), although graphite oxide obtained by other processes may be used. The original carbon materials used to make graphite oxide may be crystalline graphite, amorphous carbon, or graphitized carbon. They may be in the for of powder or fibers.

The graphite oxide thus obtained is then used as a template for further processes which will be addressed in detail in this specification.

Generally, the graphite oxide is exposed to a metal chloride at or below the thermal decomposition temperature of he graphite oxide to produce a carbonaceous material including the elements of the metal, oxygen an chlorine, hereinafter C(M,O,Cl). The metal chloride, hereinafter MCl, may be in the form of solution, pure liquid, pure vapor, or a mixture of the above forms. The BET surface are (in nitrogen) of the C(M,O,Cl) is generally less than 4 $m^2/g$ due to the presence of the non-carbon materials.

The chlorine in the C(M,O,Cl) can be removed by placing the carbonaceous product in aqueous solution containing potassium carbonate ($K_2CO_3$) or sodium carbonate ($Na_2CO_3$). This produces a carbonaceous product containing metal carbonate and oxygen, hereinafter C($MCO_3$O).

The C(M,O,CL) and C($MCO_3$,O) may then be subjected to further processing. In one preferred embodiment, the C(M,O,Cl) or C($MCO_3$,O) is heated in air at a temperature of 250° or higher to remove the carbon and chlorine by oxidation. The metal is converted to metal oxide. The metal oxide thus obtained has a large surface area which suggests its usefulness as a catalyst, solar cell, or gas sensor.

In another preferred embodiment, the C(M,O,Cl) or C($MCO_3$,O) is placed in a reducing environment. The product thus obtained is a carbonaceous material having metal particles therein. The product is potentially useful in the area of batteries and catalysts.

In yet another preferred embodiment, the C(M,O,Cl) orC($MCO_3$,O) is heated in an inert environment of, for example, nitrogen or argon. The preferred temperature is greater or equal to 700° C. In nitrogen, the preferred range is from approximately 700° C. to approximately 1200° C. In argon, the temperature range may be expanded as high as approximately 1800° C. This process completely removes, or significantly reduces the amount of chlorine or carbonate in the product. The product thus obtained is a carbonaceous metal oxide having a large BET surface area suggesting its usefulness in the are of batteries and catalysts.

The products formed by the above processes take the shape of the carbon precursor whether it be powder, fiber or fabric.

The invention is more particularly described in the examples that follow. However, it should be understood that the present invention is by no means restricted by these specific examples.

EXAMPLE I

Graphite oxide made from commercially purchased crystalline graphite powder (325 mesh) was exposed to an excess quantity of $AlCl_3$, also commercially purchased, at a temperature histogram as follows: At 120° C. for 18 hours, then up to 185° C. in 6 hours, then at 185° C. for 20 hours, then up to 230° C. in five minutes, then at 230° C. for 15 minutes, before removing the reaction product from the reactor. Elemental analysis indicated that the O:C atomic ratio was approximately 1.4, where the oxygen atoms were either a part of the graphite oxide or a part of water. The final temperature at 230° C. for a short time was used to evaporate the unreated $AlCl_3$ (boiling point 183° C.).

The initial reaction product, C(M,O,Cl), was subjected to elemental analysis for bulk composition, X-ray photoelectron spectroscopy (XPS) for surface analysis, and X-ray diffraction (XRD) for structure analysis. The elemental analysis data indicated the bulk Al:C atomic ratio was 0.23. The XPS data indicated the surface Al:C atomic ratio was 0.32. The XRD data showed no peak at all, indicating a highly disordered, or amorphous structure. The energy dispersive spectrum (EDS) data, which detect and analyze the chemical elements of the sample in the region within 3 microns from the surface, indicated that the Al:Cl atomic ratio was about 1:3. This indicated that the chlorine atoms that came to this carbonaceous material in the form of $AlCl_3$ mostly stayed in the final product. It is believed that the high concentration of non-carbon elements distorted the orderly structure of graphite crystals. The BET surface area of reaction product C(M,O,Cl) was determined to be 3 $m^2/g$.

In one embodiment of the invention, the C(M,O,Cl) was subjected to heating in an inert environment. Specifically, heating C(M,O,Cl) in 1000° C. nitrogen yielded a reaction product having a BET surface area of 75 $m^2/g$. XRD of reaction product showed peaks of graphite and gamma—$Al_2O_3$, indicating a carbonaceous material containing metal oxide.

It is believed that some of the non-carbon materials as well as a small amount of carbon were removed from the interior of the C(M,O,Cl) during the heating process which resulted in the increased surface area restored carbon structure.

Quickly heating the C(M,O,Cl) up to 1800° C. in argon resulted in a product that contained a large quantity of Al, a small amount of O, and a number impurities.

In a further embodiment of the invention, the C(M,O,Cl) was burned in air at 400° C. for 109 hours, then 500° C. for 108 hours, and finally 600° C. for 39 hours until complete oxidation was obtained. The reaction product was characterized by a BET surface area of 80 $m^2/g$. XRD revealed gamma—$Al_2O_3$ only, indicating a metal oxide. It is believed that the high surface are of this reaction product suggests potential use as a catalyst or gas sensor.

EXAMPLE II

Graphite oxide prepared from a commercially purchased amorphous carbon powder (325 mesh) was exposed directly to bromoform solution containing $AlCl_3$ at 100° C. for 115 minutes. The XRD data indicated that the "amorphous" carbon contained a small amount of crystalline graphite. The C(M,O,Cl) obtained was rinsed with cold distilled water before characterization. According to XRD, the molecular structure of the graphite oxide disappeared and no new XRD peaks were formed. According to EDS data, the reaction product was carbon containing Al and Cl. Some bromine from the solvent was also present. The EDS data suggest the Al:Cl:Br atomic ratio was approximately 2:1:1, and the Al:C ratio was at least 1:6.

EXAMPLE III

Graphite oxide prepared from a commercially purchased amorphous carbon powder (325 mesh) was exposed directly to bromoform solution containing $AlCl_3$ at room temperature for 115 minutes. As in EXAMPLE II, the reaction product was rinsed in cold distilled water. Similar to EXAMPLE II, the molecular structure of the graphite oxide was destroyed. However, this reaction product contained very little, if any, bromine. Instead, XRD of the reaction product revealed highly crystalline $AlCl_3.6H_2O$. The EDS suggest that the Al:C ratio was at least 1:3.

EXAMPLE IV

Graphite oxide prepared from a commercially purchased crystalline graphite powder (325 mesh) was exposed directly excess quantities of both $I_2$ and LiCl at 130° C.–150° C. for 22 hours, then heated in 184° C.–194° C. for 2 hours to remove unreacted $I_2$. XPS data of the reaction product indicated its surface was such that the atomic C:Li:Cl was 1:0.08:0.14. Elemental analysis indicated that its bulk was such that the atomic Cl:LI:Cl was 1:4.4:4.5. The XRD data showed sharp and high peaks for both LiCl and $LiCl.H_2O$. These data suggest that the carbonaceous product being studied had a surface that was mostly carbon. But, in the interior, the carbon in this "carbonaceous material" actually contained much more LiCl than carbon itself. The product was quickly rinsed and dried in 150° C. nitrogen. The rinsed reaction product was then examined by XRD and EDS. The XRD indicted the presence of $LiCl.H_2O$. It is believed that the $LiCl.H_2O$ was located at the interior of the carbon material because surface LiCl would have been easily removed by the rinsing process. EDS data shows the presence of a large quantity of chlorine. (EDS does not provide information on lithium because it is an element lighter than boron.) According to the EDS data, the chlorine to carbon ratio was at least 1:4.

Part of this product was further rinsed in ethanol at room temperature. The process appears to dissolve most of the non-carbon elements. Nothing but trace amounts of non-carbon elements were detected by EDS.

Instead of rinsing with ethanol, part of this product was rinsed again with water for 3 more times. The sample lost 86% of its weight during these 4 times of water rinsing. EDS data again indicated the presence of only traces of then on-carbon elements.

These results suggest that the LiCl in the carbon, although not on the surface, can be reached and dissolved by a number of different solvents. The dissolvation can be nearly complete if the solvent quantity is large, and the time for dissolvation is sufficiently long.

EXAMPLE V

A sample of graphite oxide prepared according to Example IV was exposed to a water solution containing LiCl at 100° C. The reaction product thus obtained was similar to the reaction product obtained in Example IV in that the carbon contained lithium and chlorine. The EDS data suggests that the chlorine to carbon ratio was at least 1:4.

EXAMPLE VI

Another sample of graphite oxide prepared according to Example IV was exposed to a water solution containing saturated $ZnCl_2$ at 130° C. for eight hours, then 170° C. for 37 hours. This reaction product was carbon containing $ZnCl_2$. Further treatment of this reaction product in air at 300° C. for 13 hours, then 350° C. for 70 hours, then 400° C. for 74 hours, produced ZnO powder having a surface area of 30 $m^2g$, indicating full oxidation.

An alternate embodiment of the invention produces doped products by exposing the graphite oxide to a mixture of several metal chlorides. The dopant(s) can be added to the reactants either as impurities, as elements or as compounds.

EXAMPLE VII

The gamma—$Al_2O_3$ of EXAMPLE I was successfully observed by SEM without metal or carbon coating, therefore, it is not an insulator. The conductivity of this product is believed to come from the small amount of potassium present in the gamma—$Al_2O_3$. The potassium came from $KMnO_4$ which was used in the process of making the graphite oxide from graphite. The presence of potassium in the gamma—$Al_2O_3$ suggests that doped graphite oxide may be obtained by mixing the dopant in the reactants before the graphite oxide is formed from the graphite. It is also suggested that doped graphite fluoride could be formed by adding the dopant(s) before forming graphite fluoride by methods known in the art.

EXAMPLE VIII

A experiment similar to the first part of Example I was conducted, except that the graphite oxide was prepared from commercially purchased activated carbon having a BET surface area of 1100 $m^2/g$, and that its reaction to $AlCl_3$ had a temperature histogram of 120 ° C. for 18 hours, 140° C. for 1 hours, 160° C. for 3 hours, 170° C. for 2 hours, 180° C. for 9 hours, 193° C. for 9 hours, and 225° C. for 0.2 hour.

The carbonaceous materials thus formed were found to be amorphous (XRD analysis) with an atomic O:C ratio of about 0.5. (The oxygen atoms include those from water.) The surface area was 30 m²g.

According to EDS data, after the reaction with $AlCl_3$, the atomic Al:C ratio was about on fourth of that obtained in Example I, but its atomic Al:Cl ratio was about 2.5 times that obtained from Example I. These results indicate that, contrary to Example I, much of the chlorine atoms that come to this carbonaceous material in the form of $AlCl_3$ were not present in the product.

EXAMPLE IX

An experiment similar to Example IV was conducted, except that the graphite oxide was prepared with its non-carbon reactants ($KMnO_4$, $NaNO_3$, and $H_2SO_4$) at 50% of the quantities described in the process by Hummers and Offeman (1958).

After the reaction with excess quantities of LiCl and iodine, the product was soaked and mixed in distilled water in a test tube. The volume of distilled water utilized was approximately the same as the bulk volume of the carbonaceous material. This mixture was then placed in a centrifuge for separation. Excess water which was clear and containing no carbonaceous product was then quickly removed. The wet product was then dried in 120° C. nitrogen. The time from adding the distilled water to drying the sample was less than 5 minutes.

The dried product was then mixed with 2M $K_2CO_3$ water solution. The volume of the solution was approximately 5 times the bulk volume of the dried carbonaceous material. The sample remained in the $K_2CO_3$ solution for 30 minutes. The mixture was then centrifuged again. The excess water was removed and the wet sample transferred to a watch glass and placed into 120 ° C. nitrogen for overnight drying.

The carbonaceous product thus obtained contained $Li_2CO_3$ according to XRD analysis. Elemental analysis indicated that the lithium concentration in the product was 14 % by weight.

It is believed that the carbonaceous reaction product containing the metal carbonate can be further processed to yield useful reaction products. Placing the $C(MCO_3,O)$ in a reducing environment, such as reaction with magnesium or aluminum, would produce a product comprising carbon and elemental metal.

Heating the $C(MCO_3,O)$ causes the metal carbonate to dissociate. If the heating is done in air, the final reaction product would be the metal oxide. If the heating is done in an inert environment, the final reaction product would be metal oxide particles in carbon.

ALTERNATE EMBODIMENTS

The presence of bromine in the reaction product of EXAMPKE II suggests that the doping may be done by exposing the graphite oxide to dopants along with the metal chloride. Also, the dopants may include one or more metal chlorides.

Washing the C(M,O,Cl) with distilled water reduces the particle sizes of the non-carbon content and could thereby increase the surface area of the carbonaceous reaction product.

The present invention has been described with reference to the preferred embodiment. Obviously, modifications and alterations will occur to others upon a reading and understanding of the specification. It is intended by the applicant to include all such modifications and alterations insofar as they come within the scope of the appended claims or the equivalents thereof.

Having thus described the invention, it is now claimed:

1. A process for producing material comprising metal compounds from graphite oxide comprising the steps of:

providing graphite oxide;

exposing the graphite oxide to a metal chloride at or below the thermal decomposition temperature of the graphite oxide for sufficient tine to form an intermediary carbonaceous reaction product comprising elements of metal, oxygen, and chlorine; and removing the chlorine from the intermediary carbonaceous reaction product by heating the intermediary reaction product in air at a temperature of at least 300° C. for a time sufficient to oxidize and remove carbon and chlorine to produce a metal oxide product.

* * * * *